United States Patent
Kakish

(10) Patent No.: US 9,698,604 B1
(45) Date of Patent: Jul. 4, 2017

(54) EXTENDING HIGH POWER DELIVERY TO AN INCOMPATIBLE DEVICE BY EMULATING A COMPATIBLE DEVICE

(71) Applicant: Western Digital Technologies, Inc., San Jose, CA (US)

(72) Inventor: Musa I. Kakish, Anaheim, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 464 days.

(21) Appl. No.: 14/088,811

(22) Filed: Nov. 25, 2013

Related U.S. Application Data

(60) Provisional application No. 61/883,827, filed on Sep. 27, 2013.

(51) Int. Cl.
*G06F 1/32* (2006.01)
*H02J 4/00* (2006.01)
*G06F 1/26* (2006.01)

(52) U.S. Cl.
CPC . *H02J 4/00* (2013.01); *G06F 1/26* (2013.01)

(58) Field of Classification Search
CPC ................................. G06F 1/26; G06F 1/3204
USPC ........................................................ 713/300
See application file for complete search history.

(56) References Cited

U.S. PATENT DOCUMENTS

| | | | | |
|---|---|---|---|---|
| 5,483,656 A * | 1/1996 | Oprescu | ................... | G06F 1/26 700/297 |
| 9,052,884 B2 * | 6/2015 | Sip | ....................... | G06F 1/3265 |
| 2003/0172312 A1 * | 9/2003 | Takahashi | ............... | G06F 1/266 713/300 |
| 2003/0188205 A1 * | 10/2003 | Mylly | ..................... | G06F 1/266 713/300 |
| 2005/0046391 A1 * | 3/2005 | Veselic | ................... | G06F 1/266 320/133 |
| 2009/0039845 A1 * | 2/2009 | Gerber | ....................... | G05F 1/56 323/273 |
| 2010/0100750 A1 * | 4/2010 | Bobrek | .................... | H04L 12/10 713/300 |
| 2010/0169523 A1 * | 7/2010 | Dunstan | ................ | G06F 9/4411 710/104 |
| 2011/0191480 A1 * | 8/2011 | Kobayashi | ............. | H01R 11/00 709/227 |
| 2011/0208980 A1 * | 8/2011 | Brooks | .................... | G06F 1/266 713/300 |
| 2012/0078690 A1 * | 3/2012 | Harriman | ........... | G06Q 30/0241 705/14.4 |
| 2012/0297207 A1 * | 11/2012 | Carlsen | ............... | G06F 13/4081 713/300 |
| 2013/0013270 A1 * | 1/2013 | Musiige | ............... | G06F 17/5036 703/2 |
| 2013/0145071 A1 * | 6/2013 | Chu | ....................... | G06F 13/385 710/313 |
| 2013/0166925 A1 * | 6/2013 | Sip | ......................... | G06F 1/3265 713/300 |

(Continued)

*Primary Examiner* — Jaweed A Abbaszadeh
*Assistant Examiner* — Volvick Derose

(57) ABSTRACT

A power delivery device including a microcontroller configured to emulate a compatible device to negotiate power delivery from an on demand power serial interface in a power source device, wherein the compatible device is configured to communicate with the power source device using a high speed protocol, and provide the delivered power to a target device, wherein the target device is incompatible with the on demand power serial interface of the power source device.

23 Claims, 7 Drawing Sheets

(56) References Cited

U.S. PATENT DOCUMENTS

| | | | | |
|---|---|---|---|---|
| 2014/0077777 A1* | 3/2014 | Vemula | ................... | G05F 1/56 323/280 |
| 2014/0095899 A1* | 4/2014 | Sultenfuss | .............. | G06F 1/266 713/300 |
| 2014/0245030 A1* | 8/2014 | Helfrich | .................. | H02M 7/04 713/300 |

* cited by examiner

EXTENDING HIGH POWER DELIVERY TO AN INCOMPATIBLE DEVICE BY EMULATING A COMPATIBLE DEVICE

CROSS-REFERENCE TO RELATED APPLICATIONS

This application claims the benefit of U.S. Provisional Application No. 61/883,827, filed on Sep. 27, 2013, entitled "EXTENDING HIGH POWER DELIVERY TO A NON-COMPATIBLE DEVICE BY EMULATING A COMPATIBLE DEVICE," which is hereby incorporated by reference in its entirety.

BACKGROUND

Conventionally, powered devices like fans or LED lights use power from a universal serial bus ("USB") port to operate. However, these devices may not consume more than a predetermined maximum power threshold since the USB port may not supply more than the predetermined maximum power threshold. In some instances, electronic devices may utilize amounts of power greater than the predetermined maximum power threshold. In such a case, the power from a host which supplies power at or below the predetermined maximum power threshold may be insufficient to power the electronic device.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
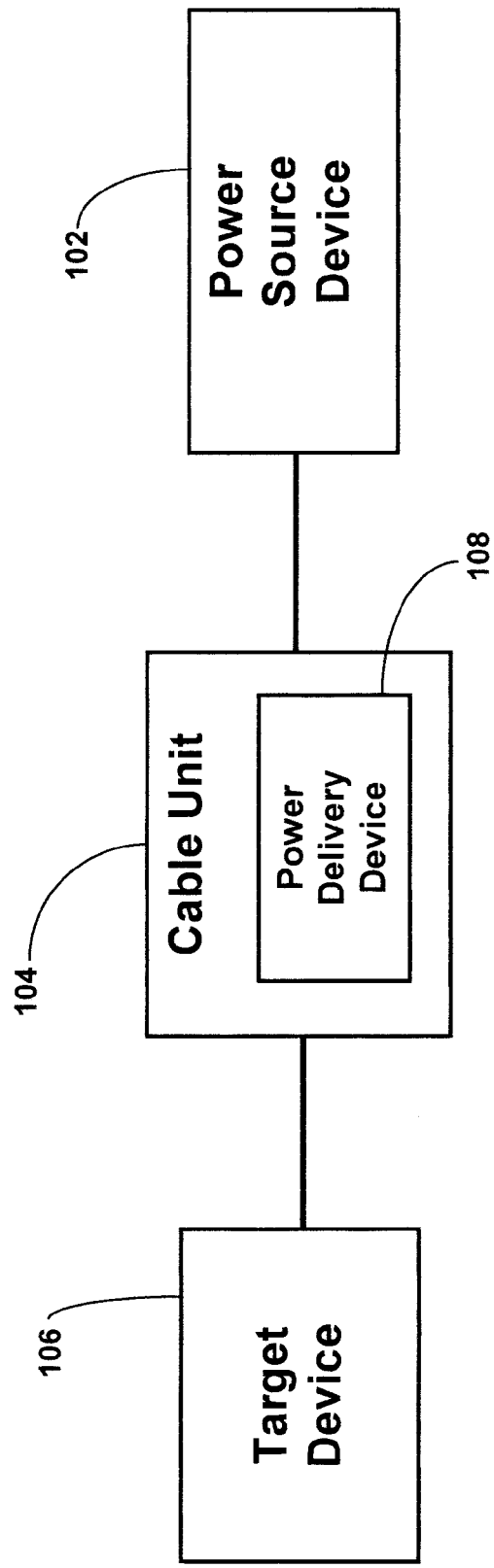
FIG. 1 depicts a power delivery device located in a cable unit according to an embodiment.

In an embodiment shown in FIG. 1, a power source device 102 can be connected to a target device 106 through a cable unit 104. In an embodiment, the power source device 102 can be configured to supply power to the target device 106. In an embodiment, the power source device 102 can be, for example, a host. In an embodiment, the power source device 102 can comprises a laptop, a computer, a tablet, a media player appliance, or other electronic device which may be configured to supply power to another electronic device. In an embodiment, the power source device 102 may comprise a storage device to store data.

In an embodiment, the power source device 102 can utilize a high speed protocol to deliver large amounts of power to the target device 106. For example, the power source device 102 can be configured to deliver approximately 12 watts of power to the target device 106.

In an embodiment, the high speed protocol comprises a Thunderbolt protocol. In an embodiment, the high speed protocol is configured to transmit data of at least a first data rate. In an embodiment, the first rate comprises at least 5 Gb/s. In an embodiment, the first rate comprises at least 10 Gb/s. In an embodiment, the first rate comprises at least 20 Gb/s. In an embodiment, the high speed protocol is configured to transmit data at additional rates. In an embodiment, the high speed protocol need not comprises the Thunderbolt protocol. Instead, the high speed protocol could comprise alternative protocols which can transmit data of at least the first data rate.

In an embodiment, the high speed protocol can comprise, for example, an on demand power delivery serial interface. In an embodiment, the on demand power delivery serial interface comprises a Thunderbolt interface.

In an embodiment, the on demand power delivery serial interface is configured to deliver different amounts of power before and after negotiations. In an embodiment, an on demand power delivery serial interface delivers a first amount of power prior to negotiations. In an embodiment, the on demand power delivery serial interface delivers a second amount of power greater than the first amount of power after negotiations. The on demand power delivery serial interface need not be limited to the Thunderbolt interface. In an embodiment, the on demand power delivery serial interface comprises alternative interfaces which utilize negotiations to vary or increase amounts of power supplied by the power source device.

In an embodiment, the first amount of power comprises no power or less than 1 W of power. In an embodiment, the first amount of power comprises approximately 0.33 W of power. In an embodiment, the second amount of power comprises approximately 12 W of power. However, in an embodiment, the first amount of power and the second amount of power can comprise other power amounts.

In an embodiment, the target device 106 comprises, for example, electronic devices which may utilize the power supplied from the power source device 102, without communicating with the power source device 102 at a high speed, which will be described in more detail below.

In an embodiment, the target device 106 can comprise, for example, a fan, a lamp, a speaker, a charging station, a power hub capable of providing power to other devices, or any other electronic device which may utilize a higher amount of power. In an embodiment, the electronic device may utilize a higher amount of power than 5 W or utilize power from the power source device 102 which requires negotiations for power delivery. In an embodiment the charging station can comprise a wireless charging pad, such that an electronic device need not be connected to the wireless charging pad to be charged.

In an embodiment, a power delivery device 108 is located in the cable unit 104. The power delivery device 108 can, for example, be utilized where a high speed protocol is used by the power source device 102 in order to deliver power from the power source device 102 to the target device 106, which will be described in more detail below.

Figure 2:
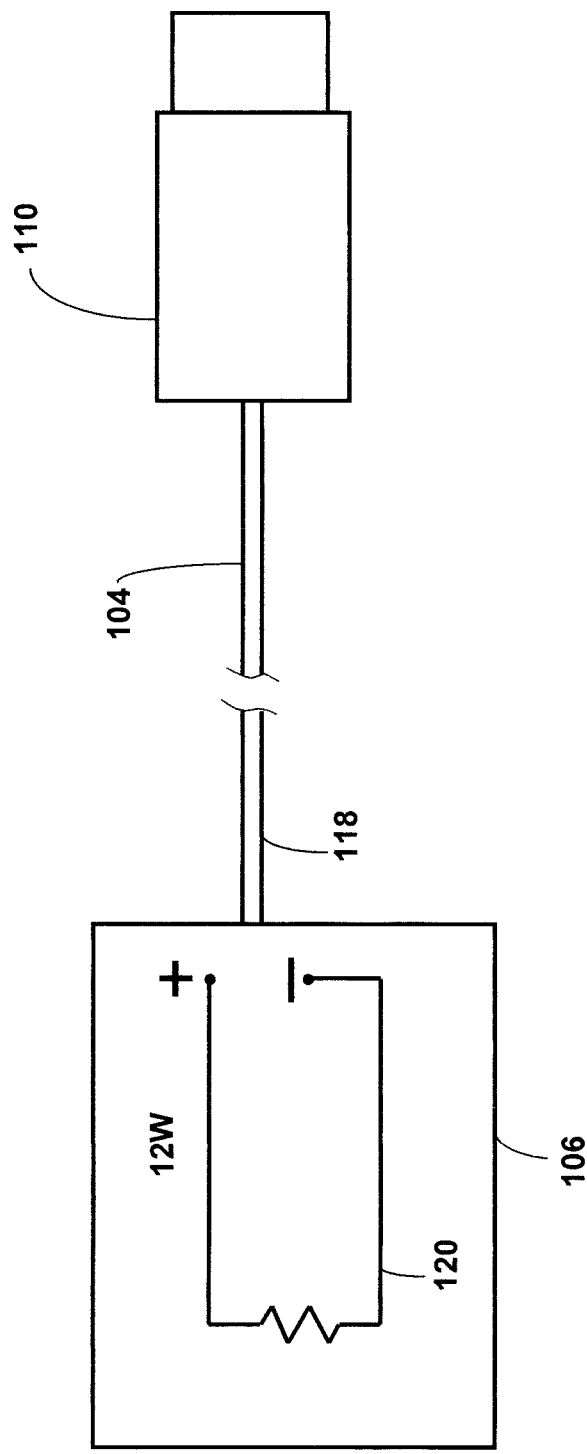
FIG. 2 depicts a cable unit according to an embodiment.

In an embodiment, the cable unit 104 and the target device 106 are shown in FIG. 2. The cable unit 104 comprises, for example, a plug 110 and a cable 118. In an embodiment, the plug 110 is configured to be connected to the power source device 102. In an embodiment, an additional, optional plug may be located between the cable 118 and the target device 106 in order to facilitate a connection between the cable 118 and the target device 106. In the embodiment shown in FIG. 2, the target device 106 comprises a load 120 to receive the power from the power source device 102. In an embodiment the load 120 comprises a power unit configured to power the target device 106.

Figure 3:
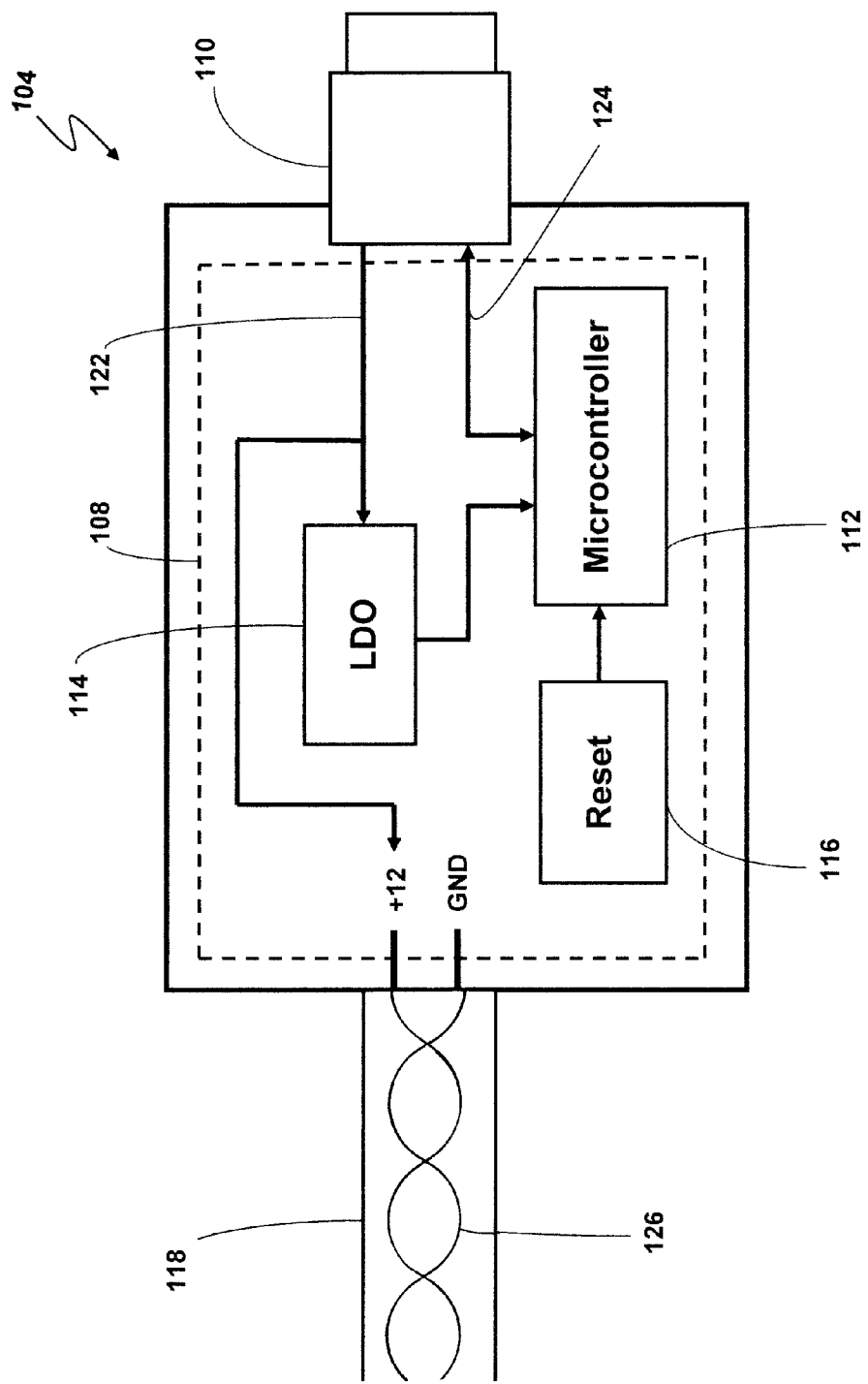
FIG. 3 depicts a power delivery device located in a cable unit according to an embodiment.

In an embodiment, the cable unit 104 is shown in FIG. 3. As can be seen in the embodiment shown in FIG. 3, the power delivery device 108 can be located on the plug 110 in the cable unit 104.

In an embodiment, the power delivery device 108 comprises a microcontroller 112, power inputs 122, communication inputs 124, a reset unit 116, and a load drop-out regulator ("LDO") 114. The microcontroller 112 can be configured to emulate a compatible device to negotiate power delivery from the on demand power serial interface of the high speed protocol in the power source device 102 so that the power source device 102 can deliver the second amount of power to one or more other devices.

In an embodiment the microcontroller 112 comprises an 8 bit microcontroller. In an embodiment, the microcontroller 112 comprises a 16 bit microcontroller. In an embodiment, the microcontroller 112 comprises a 32 bit microcontroller. In an embodiment the microcontroller 112 comprises a peripheral interface controller. In an embodiment, the microcontroller 112 comprises a programmable interface controller. In an embodiment, the microcontroller 112 comprises a low speed controller.

In an embodiment, the power inputs 122 are configured to provide power to power lines 126 in the cable 118 of the cable device 104. The power lines 126 can comprise, for example, a twisted pair of power lines. In an embodiment, a first power line in the twisted pair of power lines 126 is connected to a voltage source, while the second power line in the twisted pair of power lines is connected to a ground. In an embodiment, the voltage source comprises the power inputs 122. The power lines 126 can be configured to be connected to the load 120 (FIG. 2) in the target device 106 to supply power to the target device 106.

In an embodiment, the microcontroller 112 utilizes the communication inputs 124 to negotiate power delivery from the on demand power serial interface. In an embodiment, when the microcontroller 112 negotiates power delivery from the on demand power serial interface, the first power line can transmit approximately the second amount of power to the target device 106. In an embodiment the second amount of power comprises 12V at approximately 1 A for approximately 12 W of power. In an embodiment, a maximum of approximately 18V may be supplied to achieve the approximately 12 W of power. In an embodiment, during negotiations, the microcontroller 112 can indicate to the on demand power serial interface that the target device 106 is compatible with the high speed protocol, even when it is not compatible with the high speed protocol.

Thus, the power source device 102 may believe that the target device 106 is compatible with the high speed protocol and transmit the second amount of power requested. In an embodiment, when the compatible device is compatible with the high speed protocol, the compatible device can utilize the high speed protocol to communicate with the power source device over the communication inputs 124. In an embodiment, the microcontroller 112 can negotiate for power which is less than the maximum amount of power that the power source device 102 can deliver to the target device 106. Thus, the second amount of power may be less than the maximum amount of power that the power source 102 can deliver to the target device 106.

In an embodiment, the LDO 114 ensures that the microcontroller 112 receives the required voltage to operate, even if it is at a low amount of current. Thus, before higher power is requested by the power delivery device 108, the power delivery device 108 may receive the first amount of power, which may be a small amount of power, from the power source device 102. However, the first amount of power may be sufficient to power the microcontroller 112, but may be insufficient to power the target device 106. In an embodiment, the reset unit 116 can be utilized by the target device 106 to reset the microcontroller 112.

Figure 4:
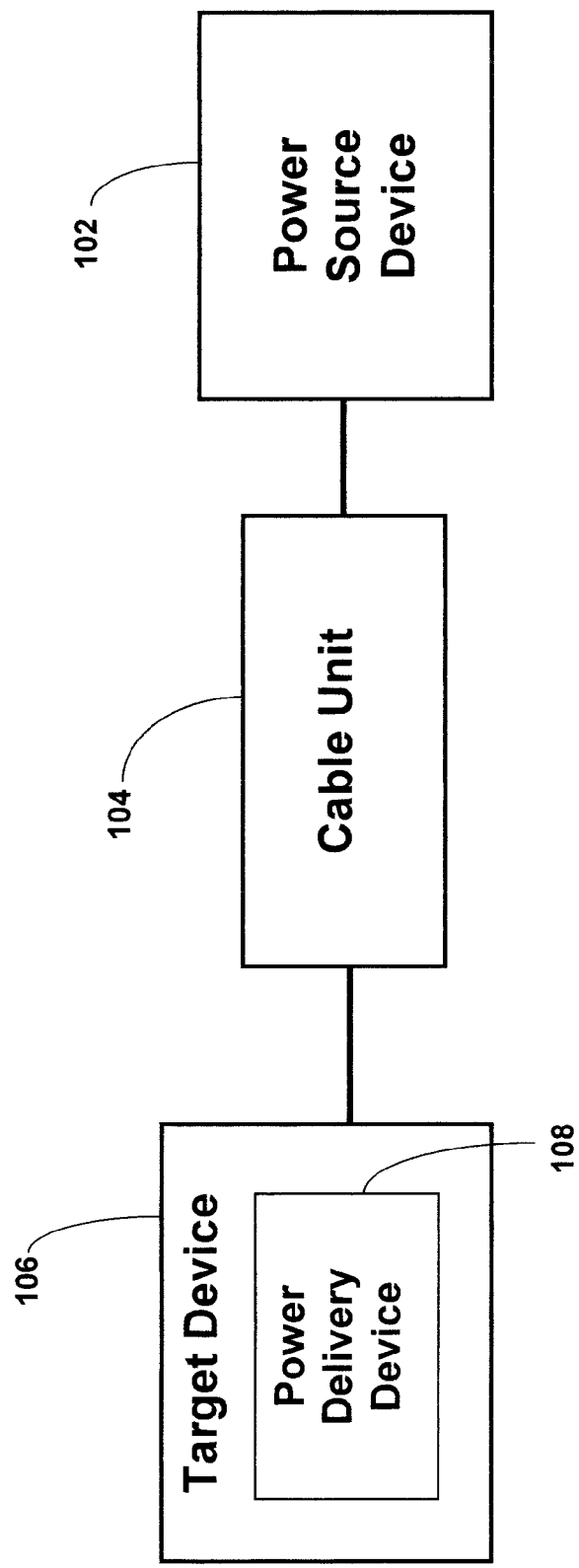
FIG. 4 depicts a power delivery device located in a target device according to an embodiment.
Figure 5:
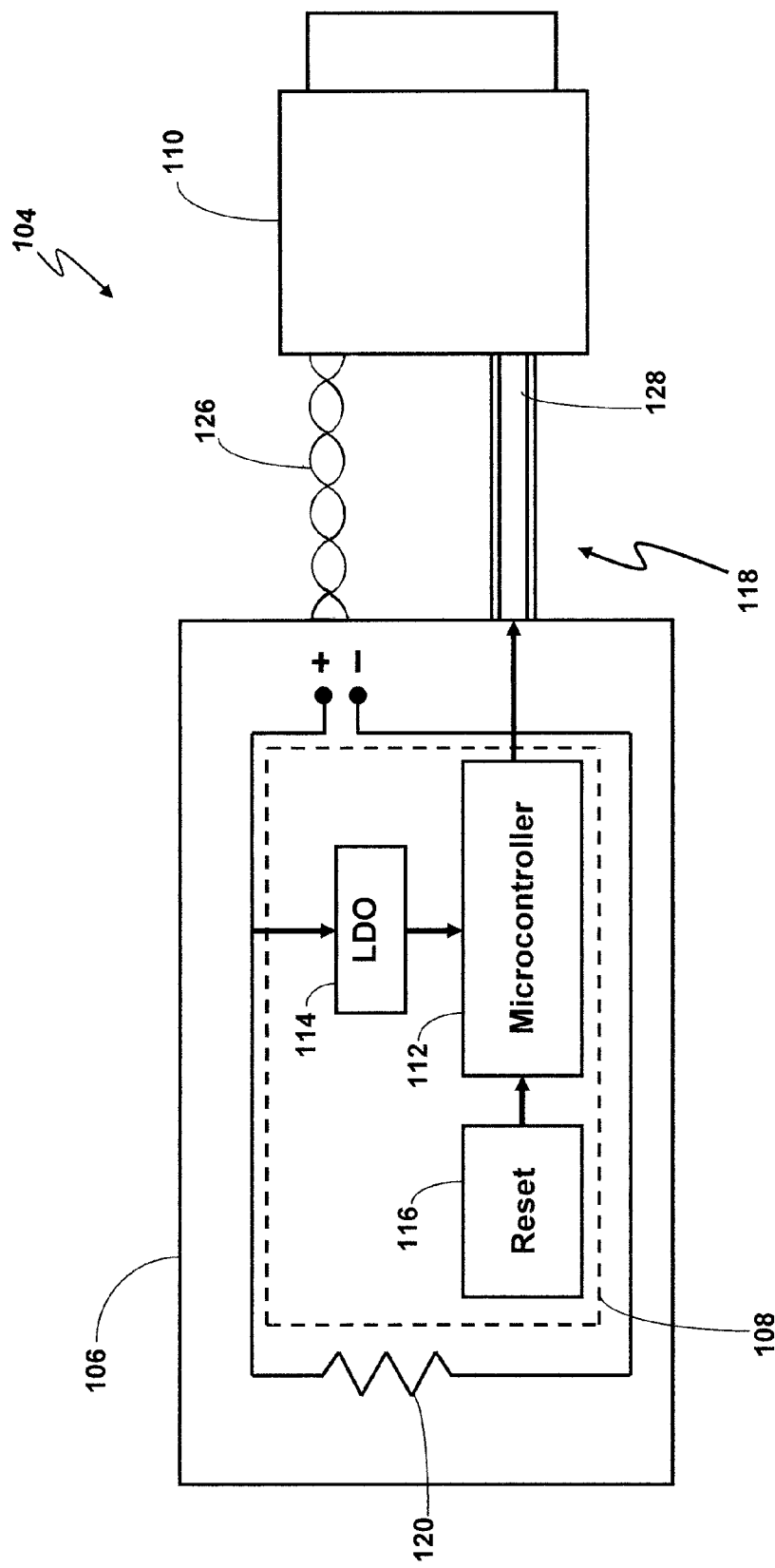
FIG. 5 depicts a target delivery device comprising a power delivery device according to an embodiment.

In an embodiment, the power delivery device 108 may be located on or incorporated into the target device 106 as shown in an embodiment in FIGS. 4 and 5. In the embodiment shown in FIG. 5, the plug 110 comprises a passive plug. In an embodiment, the power delivery device 108 functions similarly to the one shown in the embodiment in FIGS. 1-3. However, the cable unit 104 in the embodiment shown in FIGS. 4 and 5 utilizes a low speed communication line 128 to allow the microcontroller 112 to negotiate with the on demand power delivery serial interface in the power source device 102.

In an embodiment, the power delivery device 108 does not include a serial data translator. For example, the power delivery device 108 does not utilize a Thunderbolt controller. Generally, a serial data translator translates data from a first protocol to a second protocol. For example, in the case of the Thunderbolt controller, the Thunderbolt controller can translate data from the Peripheral Component Interconnect Express ("PCIe") protocol to the Thunderbolt protocol. In an embodiment, an electronic device compatible with the on demand power serial interface utilizes the serial data translator, but an electronic device incompatible with the on demand power serial interface does not utilize the serial data translator or is incapable of translating data from the first protocol to the second protocol. In an embodiment, the target device 106 is incompatible with the on demand power serial interface of the power source device 102.

In an embodiment, not requiring a serial data translator further reduces manufacturing costs since the microcontroller 112 can be utilized to allow the target device 106 to emulate a compatible device without the target device 106 or the power delivery device 108 actually having to be a compatible device. Furthermore, in an embodiment, the cable unit 104 does not need to utilize a high speed communication line and instead can utilize the low speed communication line 128 or no communication lines. In an embodiment, this can further reduce the cost of the cable unit 104 since the high speed communication line can cost more than the low speed communication line 128.

In an embodiment, the high speed communication line is configured to transmit data at a rate of at least a first data rate. In an embodiment, the high speed communication line is configured to transmit data at a rate of at least 5 Gb/s. In an embodiment, the high speed communication line is configured to transmit data at a rate of at least 10 Gb/s. In an embodiment, the high speed communication line is configured to transmit data at a rate of at least 20 Gb/s. In an embodiment, the high speed communication line is configured to transmit data at additional rates. In an embodiment, the high speed communication line comprises coaxial cable.

In an embodiment the low speed communication line 128 is configured to transmit data at a rate of a maximum of a second data rate, wherein the second data rate is less than the first data rate. In an embodiment, the low speed communication line 128 is configured to transmit data at a rate of at most 100 kilobits ("Kb")/s. In an embodiment, the low speed communication line 128 is configured to transmit data at a rate of at most 10 megabits ("Mb")/s. In an embodiment, the low speed communication line 128 is configured to transmit data at additional rates.

Figure 6:
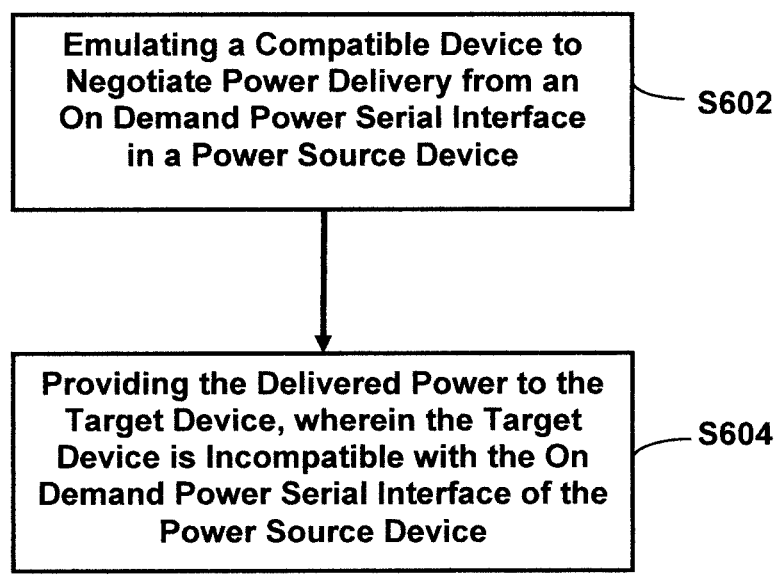
FIG. 6 depicts a process for delivering power to a target device according to an embodiment.

In an embodiment, a process for delivering power to the target device 106 is shown in FIG. 6. In block S602, the power delivery device 108 emulates a compatible device to negotiate power delivery from an on demand power serial interface in the power source device 102. For example, the microcontroller 112 can emulate a compatible device to negotiate power delivery from an on demand power serial interface in the power source device 102.

In block S604, the power delivery device 108 provides the delivered power to the target device 106, wherein the target device 106 can be, for example, incompatible with the on demand power serial interface of the power source device 102. In an embodiment, the microcontroller 112 provides the delivered power to the target device 106.

Figure 7:
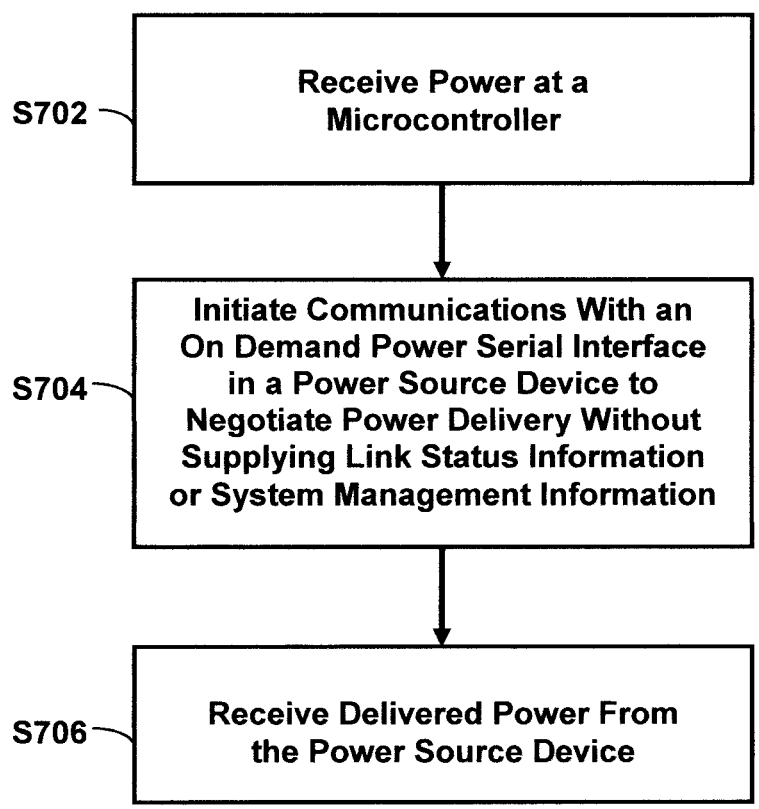
FIG. 7 depicts a process for delivering power to a target device according to an embodiment.

In an embodiment, a process for delivering power to the target device 106 is shown in FIG. 7. In block S702, the microcontroller 112 in the power delivery device 108 can receive power from the power source device 102. In an embodiment, the microcontroller 112 can receive the first amount of power. In block S704, the microcontroller can initiate communications with the on demand power serial interface in the power source device 102 to negotiate power delivery without supplying link status information or system management information. In an embodiment, this can reduce a manufacturing cost of the microcontroller 112 and/or the power delivery device 108 since the microcontroller 112 will not have to supply link status information or system management information. In block S706, the target device 106 can receive the delivered power from the power source device 102. For example, the microcontroller 112 can provide the delivered power to the target device 106. In an embodiment the delivered power comprises the second amount of power.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A power delivery device comprising:
a microcontroller configured to:
emulate a compatible device to negotiate a delivery of power from an on-demand power serial interface in a power source device to a target device that is incompatible with the on-demand power serial interface, wherein the compatible device is configured to communicate with the power source device using a high-speed protocol; and
provide the negotiated power to the target device; and
a regulator, the regulator being coupled to the on-demand power serial interface and to the microcontroller, the regulator being configured to ensure that the microcontroller receives, from the power source device, sufficient power to operate before the compatible device is emulated and before the delivery of the power is negotiated.

2. The power delivery device of claim 1, wherein the microcontroller is further configured to emulate the compatible device without using a serial data translator.

3. The power delivery device of claim 1, wherein: the microcontroller is further configured to negotiate the delivery of the power from the on-demand power serial interface using a low-speed communication line; and the low-speed communication line does not conform to data transfer requirements for the high-speed protocol.

4. The power delivery device of claim 1, wherein the microcontroller is further configured to negotiate the delivery of the power from the on-demand power serial interface to increase power delivery from the on-demand power serial interface.

5. The power delivery device of claim 1, wherein the negotiated power comprises at least 12 watts.

6. The power delivery device of claim 1, wherein the microcontroller is provided in a plug in a cable unit.

7. The power delivery device of claim 1, wherein the microcontroller is provided in the target device.

8. The power delivery device of claim 1, wherein the power delivery device is incorporated into a cable unit comprising a plug configured to be connected to the power source device.

9. The power delivery device of claim 1, wherein the power delivery device is incorporated into an electronic device comprising a power unit.

10. The power delivery device of claim 9, wherein: the target device comprises the electronic device; and the power delivery device is configured to provide power to the power unit.

11. The power delivery device of claim 1, wherein the on-demand power serial interface comprises a Thunderbolt interface.

12. The power delivery device of claim 1, wherein the high-speed protocol comprises a Thunderbolt protocol.

13. The power delivery device of claim 1, wherein the high-speed protocol is configured to transmit data at a rate of at least 10 Gb/s.

14. The power delivery device of claim 1, wherein the sufficient power received by the microcontroller from the power source device is insufficient to enable the target device to operate.

15. A method of delivering power to a target device, the method comprising:

emulating a compatible device using a microcontroller to negotiate a delivery of power from an on-demand power serial interface in a power source device to a target device that is incompatible with the on-demand power serial interface, wherein the compatible device is configured to communicate with the power source device using a high-speed protocol;

providing the negotiated power to the target device; and ensuring, using a load drop-out regulator coupled to the on-demand power serial interface and to the microcontroller, that the microcontroller receives, from the power source device, sufficient power to operate before emulating the compatible device and before negotiating the delivery of the power.

16. The method of claim 15, wherein the sufficient power received by the microcontroller from the power device is insufficient to enable the target device to operate.

17. The method of claim 15, wherein emulating a compatible device further comprises:

emulating a compatible device without using a serial data translator.

18. The method of claim 15, wherein negotiating the delivery of the power from an on-demand power serial interface further comprises:

negotiating the delivery of the power from an on-demand power serial interface using a low-speed communication line, wherein the low-speed communication line does not conform to data transfer requirements for the high-speed protocol.

19. The method of claim 15, wherein negotiating the delivery of the power from an on-demand power serial interface further comprises:

negotiating the delivery of the power from an on-demand power serial interface to increase power delivery from the on-demand power serial interface.

20. The method of claim 15, wherein the on-demand power serial interface comprises a Thunderbolt interface.

21. The method of claim 15, wherein the high-speed protocol comprises a Thunderbolt protocol.

22. The method of claim 15, wherein the high-speed protocol is configured to transmit data at a rate of at least 10 Gb/s.

23. A power delivery device comprising:

controlling means for:

emulating a compatible device and negotiating a delivery of power from an on-demand power serial interface in a power source device to a target device that is incompatible with the on-demand power serial interface, wherein the compatible device is configured to communicate with the power source device using a high-speed protocol; and providing the negotiated power to the target device; and regulating means coupled to the on-demand power serial interface and to the controlling means, the regulating means being configured to ensure that the controlling means receives, from the power source device, sufficient power to operate before emulating the compatible device and before negotiating the delivery of the power.

\* \* \* \* \*